US011741296B2

(12) United States Patent
Madaan et al.

(10) Patent No.: US 11,741,296 B2
(45) Date of Patent: Aug. 29, 2023

(54) AUTOMATICALLY MODIFYING RESPONSES FROM GENERATIVE MODELS USING ARTIFICIAL INTELLIGENCE TECHNIQUES

(71) Applicant: International Business Machines Corporation, Armonk, NY (US)

(72) Inventors: Nishtha Madaan, Delhi (IN); Naveen Panwar, Bangalore (IN); Deepak Vijaykeerthy, Bangalore (IN); Pranay Kumar Lohia, Bangalore (IN); Diptikalyan Saha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 17/178,476

(22) Filed: Feb. 18, 2021

(65) Prior Publication Data

US 2022/0261535 A1    Aug. 18, 2022

(51) Int. Cl.
*G06F 40/166* (2020.01)
*G06F 40/279* (2020.01)
(Continued)

(52) U.S. Cl.
CPC .......... *G06F 40/166* (2020.01); *G06F 40/279* (2020.01); *G06N 3/045* (2023.01); *G06N 3/088* (2013.01)

(58) Field of Classification Search
CPC ... G06F 40/166; G06F 40/279; G06N 3/0454; G06N 3/088
See application file for complete search history.

(56) References Cited

U.S. PATENT DOCUMENTS 11,170,175 B1 * 11/2021 Kohli .................... G06F 40/284
2016/0224803 A1    8/2016 Frank et al.
(Continued)

OTHER PUBLICATIONS

Bolukbasi et al., "Man is to computer programmer as woman is to homemaker? debiasing word embeddings." In Advances in Neural Information Processing Systems, pp. 4349-4357. 2016.
(Continued)

*Primary Examiner* — Bhavesh M Mehta
*Assistant Examiner* — Edward Tracy, Jr.
(74) *Attorney, Agent, or Firm* — Ryan, Mason & Lewis, LLP

(57) ABSTRACT

Methods, systems, and computer program products for automatically modifying responses from generative models using artificial intelligence techniques are provided herein. A computer-implemented method includes obtaining data pertaining to at least one conversation involving at least one automated conversation exchange software program and at least one user; identifying, among words proposed by the at least one automated conversation exchange software program in connection with the at least one conversation, words qualifying as belonging to one or more predetermined categories by processing the obtained data using artificial intelligence techniques; determining, by processing the identified words and at least one word-based data source, one or more alternate words; modifying at least a portion of the proposed words by replacing at least a portion of the identified words with at least a portion of the one or more alternate words; and performing at least one automated action based on the modifying.

16 Claims, 6 Drawing Sheets

(51) Int. Cl.
  *G06N 3/088* (2023.01)
  *G06N 3/045* (2023.01)

(56) References Cited

U.S. PATENT DOCUMENTS

| | | |
|---|---|---|
| 2019/0089656 A1 | 3/2019 | Johnson, Jr. et al. |
| 2019/0147371 A1 | 5/2019 | Deo et al. |
| 2019/0349333 A1 | 11/2019 | Pickover et al. |
| 2020/0097554 A1* | 3/2020 | Rezagholizadeh .. G06N 3/0472 |
| 2020/0134463 A1* | 4/2020 | Haidar ................ G06N 3/088 |
| 2020/0372406 A1* | 11/2020 | Wick .................... G06N 7/01 |
| 2022/0164877 A1* | 5/2022 | Kamkar ............... G06N 20/00 |

OTHER PUBLICATIONS

Zhao et al., "Men also like shopping: Reducing gender bias amplification using corpus-level constraints." arXiv preprint arXiv:1707.09457 (2017).

Madaan et al., "Analyze, Detect and Remove Gender Stereotyping from Bollywood Movies." In Conference on Fairness, Accountability and Transparency, pp. 92-105. 2018.

Caliskan et al., "Semantics derived automatically from language corpora contain human-like biases." Science 356, No. 6334 (2017): 183-186.

Mell et al. The NIST Definition of Cloud Computing, NIST Special Publication 800-145, Sep. 2011.

* cited by examiner

AUTOMATICALLY MODIFYING RESPONSES FROM GENERATIVE MODELS USING ARTIFICIAL INTELLIGENCE TECHNIQUES

BACKGROUND

The present application generally relates to information technology and, more particularly, to text generation techniques. More specifically, text generation techniques are commonly used in connection with automated conversation exchange software programs (also referred to herein as chatbots) across a variety of contexts and enterprise sectors. However, as such software programs are designed by human actors, the programs can contain (often unintentional) human biases. For example, a chatbot can drive a given conversation towards a protected attribute-specific bias (e.g., nationality) rather than infer linguistic nuances and context from question text, which can lead to issues with the user(s) of the given conversation.

SUMMARY

In one embodiment of the present invention, techniques for automatically modifying responses from generative models using artificial intelligence (AI) techniques are provided. An exemplary computer-implemented method can include obtaining data pertaining to at least one conversation involving at least one automated conversation exchange software program and at least one user, and identifying, among words proposed by the at least one automated conversation exchange software program in connection with the at least one conversation, one or more words qualifying as belonging to one or more predetermined categories by processing at least a portion of the obtained data using one or more artificial intelligence techniques. The method also includes determining, by processing the one or more identified words and at least one word-based data source, one or more alternate words, and modifying at least a portion of the words proposed by the at least one automated conversation exchange software program in connection with the at least one conversation by replacing at least a portion of the one or more identified words with at least a portion of the one or more alternate words. Further, the method includes performing at least one automated action based at least in part on the modifying.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, at least one embodiment includes automatically modifying responses from generative models using AI techniques. More specifically, such an embodiment can include neutralizing one or more forms of bias towards specific protected attributes in responses from one or more AI models (e.g., one or more AI-based generative models) in unstructured data and/or chatbot-driven conversations. Such AI models, in one or more embodiments, can include at least one generative pre-trained transformer 2 (GPT-2) language model, at least one bidirectional encoder representations from transformers (BERT) generative model, etc.

As further detailed herein, one or more embodiments include processing a chatbot-driven conversation and determining one or more alternate words if the most likely word to be used by the chatbot (via a corresponding AI-based generative model) at a given instance of the conversation belongs to one or more predetermined categories (e.g., age, gender, race, nationality, etc.). Based at least in part on such a determination, at least one embodiment includes changing one or more words generated by an AI model (e.g., an AI-based natural language generative model) by replacing one or more words with one or more different words as part of the model output.

Accordingly, one or more embodiments include providing (via a natural language generative model) one or more recommendations pertaining to certain attributes for a neutral and/or unbiased conversation response in a given chatbot-driven conversation. Such an embodiment includes learning, by processing conversation data, conversation context and updating and/or retraining at least portions of the AI model by identifying one or more protected attributes and/or domains (e.g., age, gender, race, nationality, etc.) that are prone to discrimination in at least one framework.

It is to be appreciated that although the techniques detailed herein are primarily described within the context of a text generation framework in connection with AI-based natural language interfaces, one or more embodiments can be implemented and/or incorporated into other contexts and/or use cases.

Figure 1:
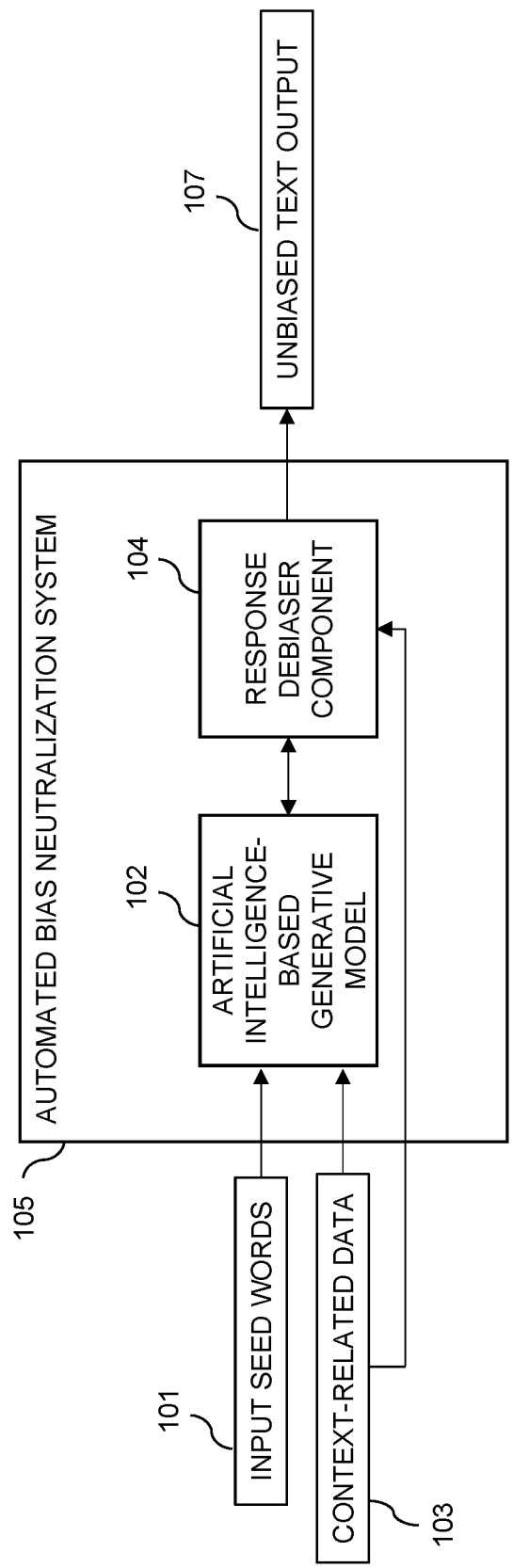
FIG. 1 is a diagram illustrating system architecture, according to an exemplary embodiment of the invention.

FIG. 1 is a diagram illustrating system architecture, according to an embodiment of the invention. By way of illustration, FIG. 1 depicts an automated bias neutralization system 105, which includes an AI-based generative model 102 and a response debiaser component 104. As also depicted in FIG. 1, input seed words 101 are provided to AI-based generative model 102, and context-related data 103 (e.g., data pertaining to the context of one or more given chatbot-driven conversations) are provided to AI-based generative model 102 and response debiaser component 104. In one or more embodiments, input seed words 101 can include words from which a sentence generation process starts. In such an embodiment, during a training process, the first two words of a sentence can be used as seed words, and context-related data can represent the domain and/or theme of generation (e.g., science, technology, sport, etc.), from which responses are generated.

Additionally, and as further detailed herein (e.g., in connection with FIG. 2), response debiaser 104 processes at least a portion of generated text (i.e., generated text yet to be output to a given conversation) and modifies one or more words in the generated text to produce and output unbiased text 107. As also illustrated in FIG. 1, determinations and/or word modifications produced by the response debiaser component 104 can be used to retrain and/or fine-tune AI-based generative model 102.

Figure 2:
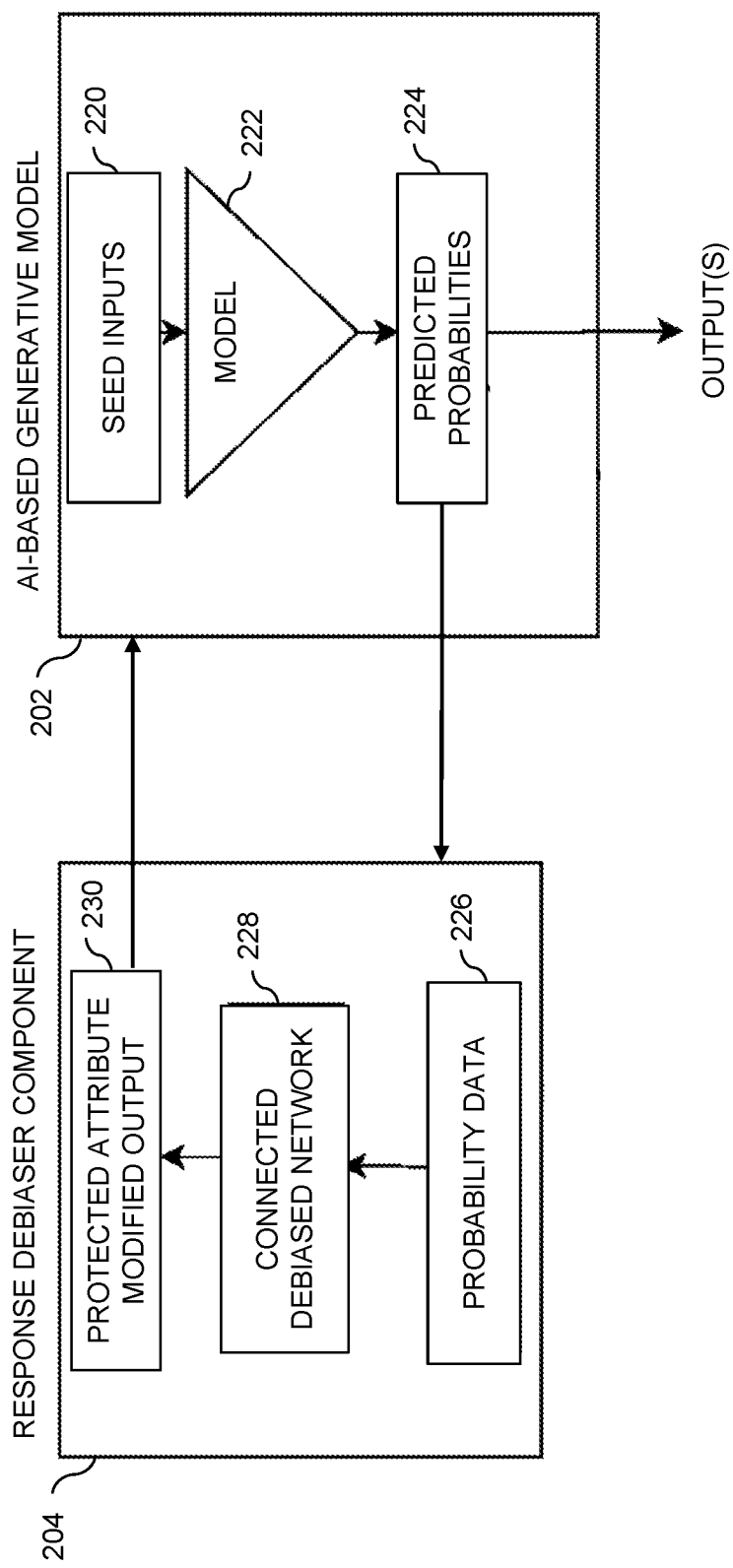
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts AI-based generative model 202 and response debiaser component 204. More specifically, in the example embodiment depicted in FIG. 2, AI-based generative model 202 includes seed inputs 220, which provides input(s) to model 222, which, based at least in part on processing the input(s) from seed inputs 220, generates one or more predicted probabilities 224. Such probabilities can be used as at least part of one or more outputs from AI-based generative model 202 and/or can be provided as input to response debiaser component 204.

As additionally depicted in FIG. 2, within response debiaser component 204, probability data 226 (based at least in part on predicted probabilities 224 provided by AI-based generative model 202) are provided as input to at least one connected debiased network 228, which generates a protected attribute modified output 230.

In an embodiment such as depicted in FIG. 2, bias is detected via AI-based generative model pertaining to at least one certain protected attribute. This is carried out by first identifying the protected attribute(s) in text that are of interest, and then performing attribute-based generation and debiasing by implementing a gradient-reversal between debiasing network and attribute-based generation component to generate a debiased output response.

Additionally or alternatively, one or more embodiments include implementing at least one fairness regularizer to AI-based generative model loss (that is, the loss function and/or objective function of the model, which is used during the training of the model) to penalize protected attributes being proposed in one or more responses. In such an embodiment, a fairness regularizer can be implemented by adding, to the AI-based generative model, at least one protected attribute-specific discriminator such that output by the AI-based generative model is increased and/or maximized and biased generation on a specific protected attribute is reduced and/or minimized. Such a functionality can be, for example, accommodated into a loss function such as: $L(x)=\min(G(x)-F(x))$, wherein $G(x)$ represents loss of the generative model, $F(x)$ represents fairness loss of a protected attribute, and $L(x)$ represents combined loss. Further, at least one embodiment can include solving such a formulation using one or more gradient reversal methods. By way of example, in one or more embodiments, a gradient reversal layer can be placed between an attribute-based generator (model) and a debiasing component. In such an embodiment, the gradient reversal layer acts as an identity function (i.e., the output is the same as the input) during forward propagation, but during back propagation, the input is multiplied by −1.

Additionally or alternatively, one or more embodiments include using bias-neutral BERT embeddings for training an AI-based generative model, and using such a trained model to predict one or more words in connection with a chatbot-driven conversation. While predicting a word, if the most likely word belongs to a predetermined category (e.g., an age-related category, a gender-related category, a race-related category, a nationality-related category, etc.), then such an embodiment includes determining if an attribute-distinct and/or attribute-opposite word also has the same likelihood of belonging to a predetermined category. Such a step can at least in part validate that the AI-based generative model is bias-neutrally trained. Further, in such a scenario, at least one embodiment can include selecting at least one word using context information derived from a portion of the conversation (e.g., from a preceding question awaiting a response).

Figure 3:
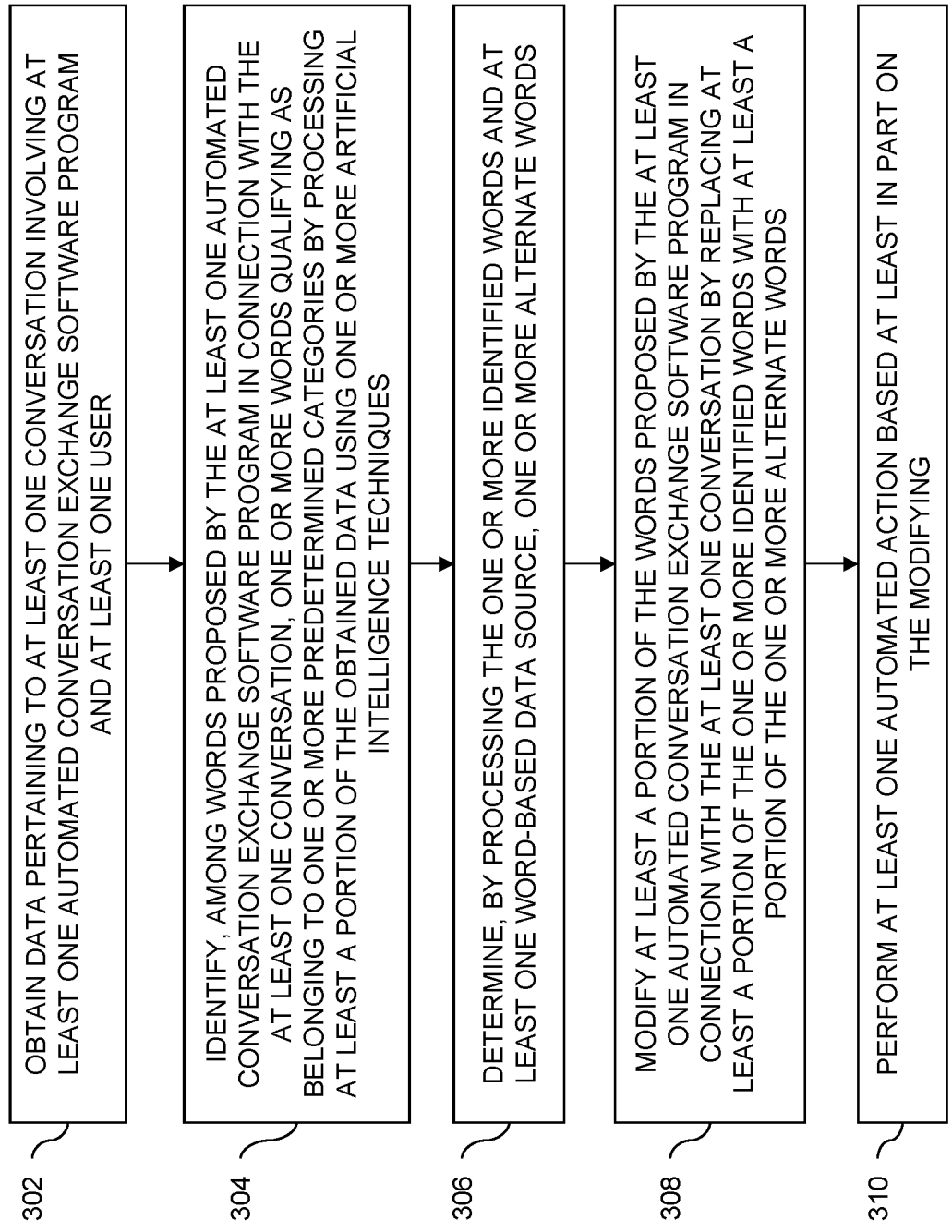
FIG. 3 is a flow diagram illustrating techniques according to an embodiment of the invention.

FIG. 3 is a flow diagram illustrating techniques according to an embodiment of the present invention. Step 302 includes obtaining data pertaining to at least one conversation involving at least one automated conversation exchange software program and at least one user. In at least one embodiment, the obtained data can include unstructured text data derived from the at least one conversation and/or context-related information derived from the at least one conversation.

Step 304 includes identifying, among words proposed by the at least one automated conversation exchange software program in connection with the at least one conversation, one or more words qualifying as belonging to one or more predetermined categories by processing at least a portion of the obtained data using one or more AI techniques. In at least one embodiment, the one or more AI techniques include at least one AI-based natural language generative model. Also, in one or more embodiments, the one or more predetermined categories include one or more categories associated with human bias (e.g., age, gender, race, nationality, etc.).

Step 306 includes determining, by processing the one or more identified words and at least one word-based data source, one or more alternate words. Step 308 includes modifying at least a portion of the words proposed by the at least one automated conversation exchange software program in connection with the at least one conversation by replacing at least a portion of the one or more identified words with at least a portion of the one or more alternate words.

Step 310 includes performing at least one automated action based at least in part on the modifying. In at least one embodiment, performing the at least one automated action includes outputting a set of words, including the modified portion, in furtherance of the at least one conversation. Additionally or alternatively, performing the at least one automated action includes training the one or more AI techniques using at least one of the one or more identified words and the one or more determined alternate words. In such an embodiment, training the one or more AI techniques includes incorporating, as part of the one or more AI techniques, at least one discriminator which penalizes proposal of the one or more identified words. Additionally or alternatively, training the one or more AI techniques includes using bidirectional encoder representations from transformers embeddings based at least in part on at least one of the one or more identified words and the one or more determined alternate words.

Also, in one or more embodiments, software implementing the techniques depicted in FIG. 3 can be provided as a service in a cloud environment.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
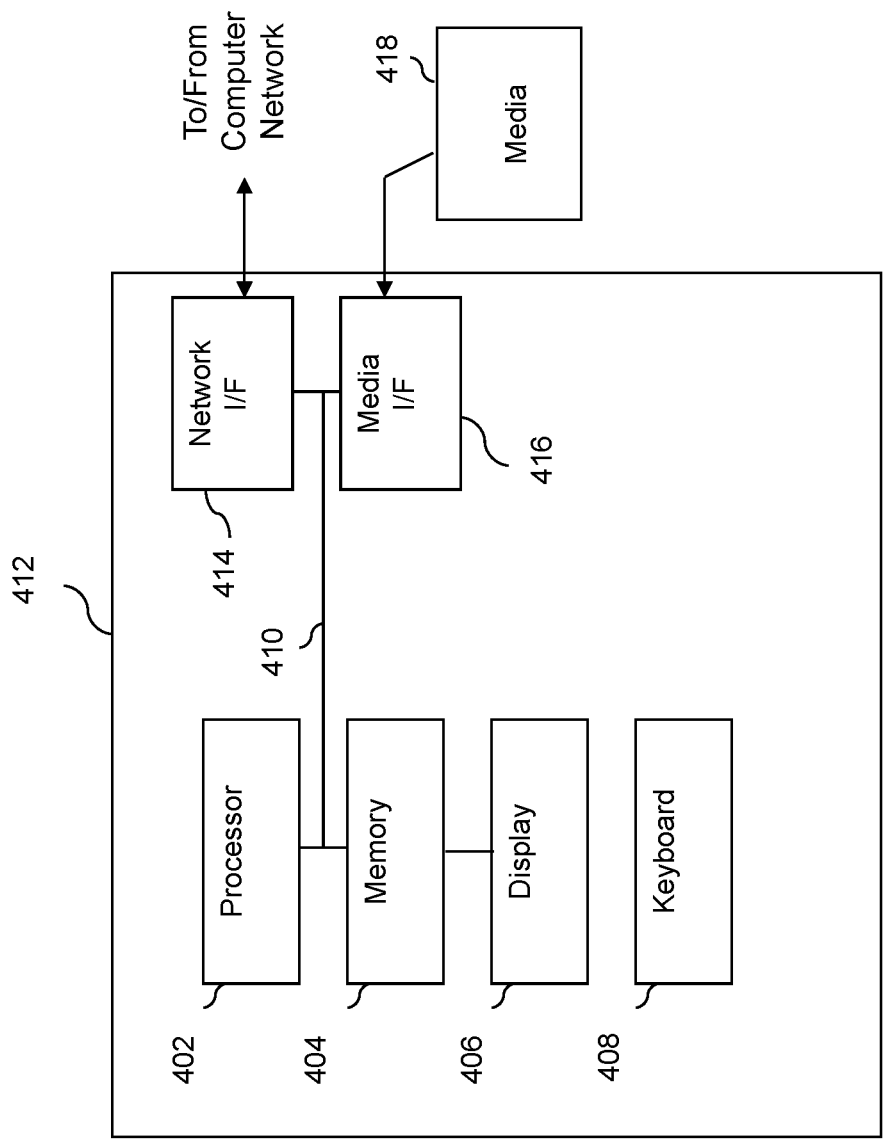
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
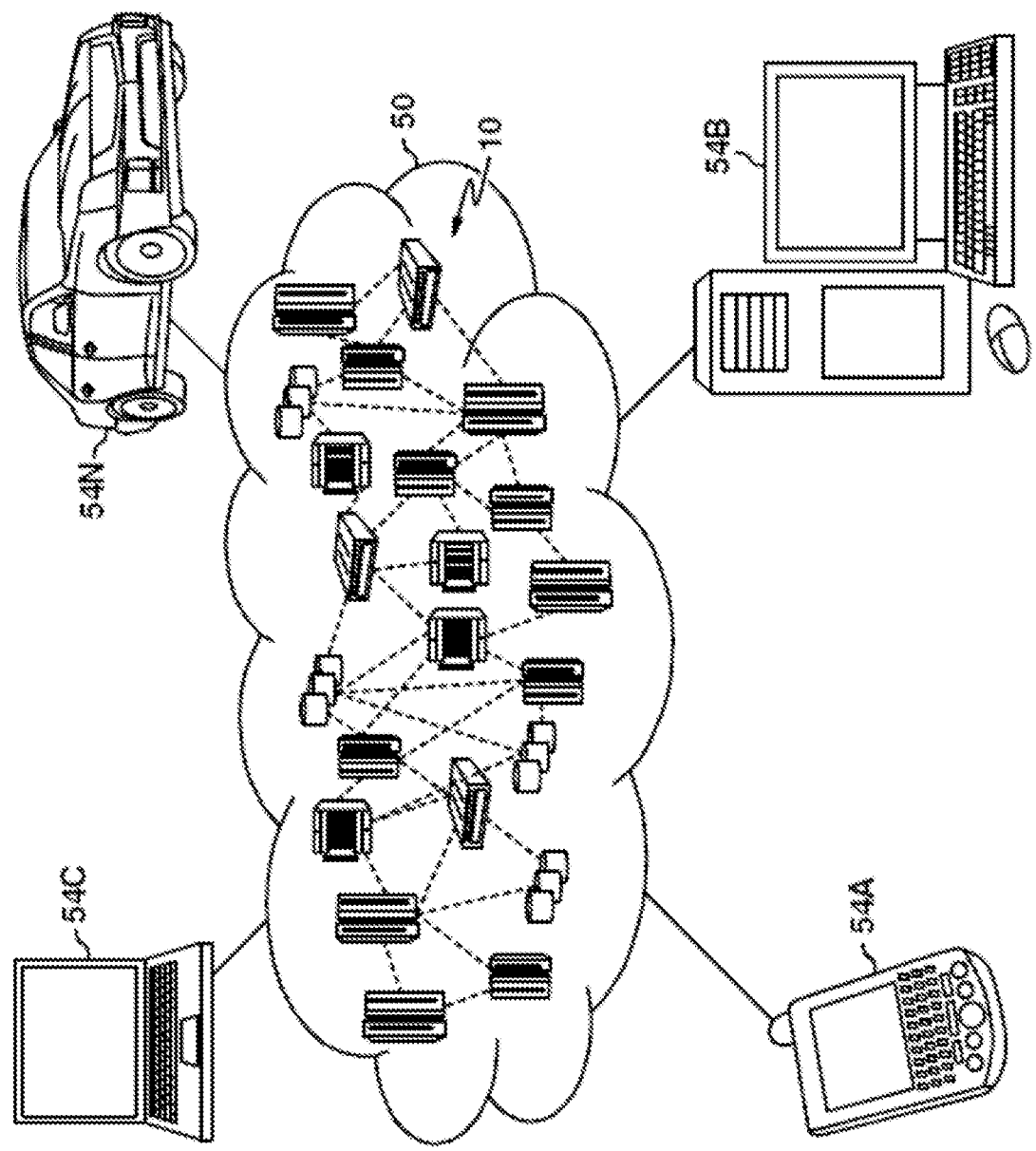
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
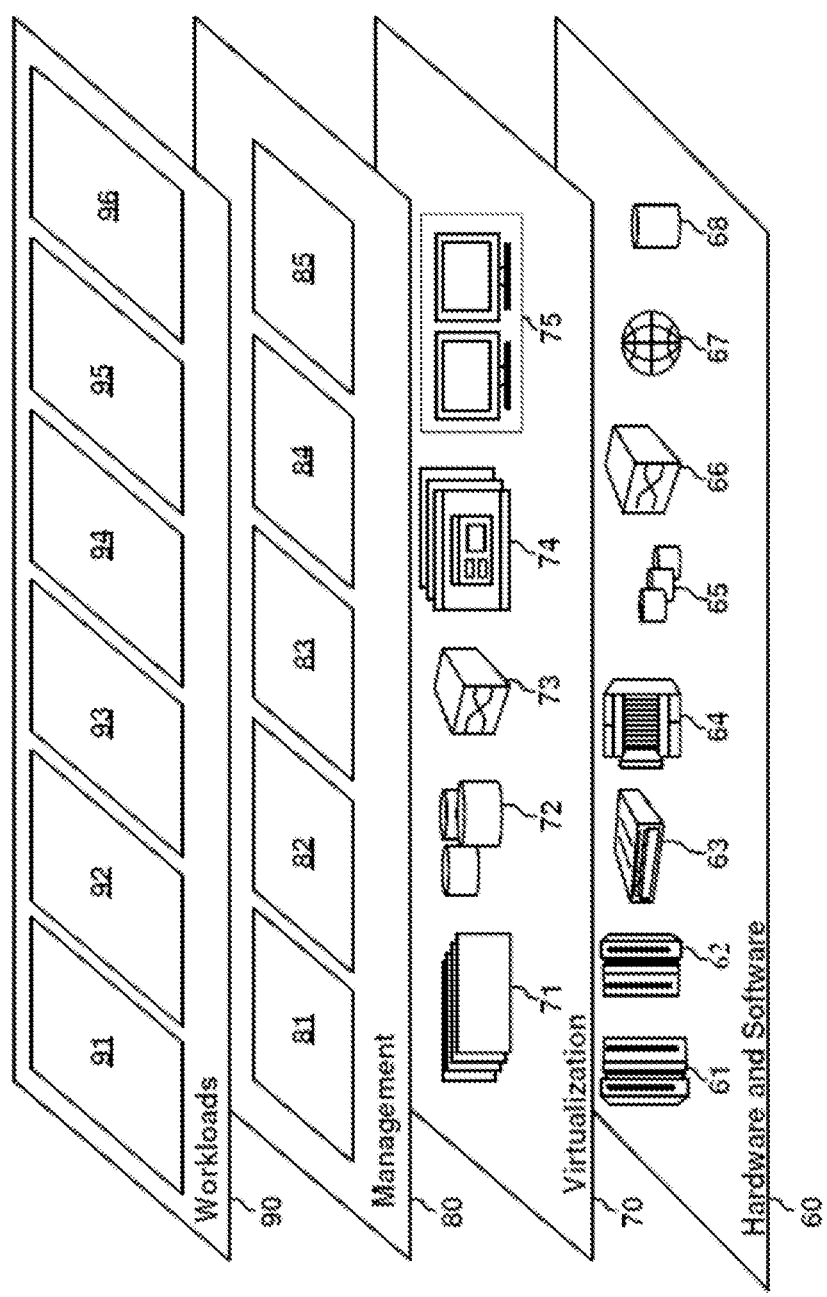
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated generative model response modification 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically modifying responses from generative models using artificial intelligence techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining data pertaining to at least one conversation involving at least one automated conversation exchange software program and at least one user;
identifying, among words proposed by the at least one automated conversation exchange software program in connection with the at least one conversation, one or more words qualifying as belonging to one or more predetermined categories by processing at least a portion of the obtained data using one or more artificial intelligence techniques, wherein the one or more artificial intelligence techniques comprise at least one artificial intelligence-based natural language generative model, and wherein identifying one or more words comprises penalizing one or more predetermined attributes proposed in one or more outputs of the at least one automated conversation exchange software program by implementing at least one regularizer to at least one loss function of the at least one artificial intelligence-based natural language generative model;
determining, by processing the one or more identified words and at least one word-based data source, one or more alternate words;
modifying at least a portion of the words proposed by the at least one automated conversation exchange software program in connection with the at least one conversation by replacing at least a portion of the one or more identified words with at least a portion of the one or more alternate words; and
performing at least one automated action based at least in part on the modifying, wherein performing the at least one automated action comprises training at least a portion of the one or more artificial intelligence techniques using one or more bidirectional encoder representations generated from one or more transformer embeddings, the one or more transformer embeddings based at least in part on at least one of the one or more identified words and the one or more determined alternate words;
wherein the method is carried out by at least one computing device.

2. The computer-implemented method of claim 1, wherein performing the at least one automated action comprises outputting a set of words, including the modified portion, in furtherance of the at least one conversation.

3. The computer-implemented method of claim 1, wherein performing the at least one automated action comprises training the one or more artificial intelligence techniques using at least one of the one or more identified words and the one or more determined alternate words.

4. The computer-implemented method of claim 3, wherein training the one or more artificial intelligence techniques comprises incorporating, as part of the one or more artificial intelligence techniques, at least one discriminator which penalizes proposal of the one or more identified words.

5. The computer-implemented method of claim 1, wherein the one or more predetermined categories comprise one or more categories associated with human bias.

6. The computer-implemented method of claim 1, wherein the obtained data comprise unstructured text data derived from the at least one conversation.

7. The computer-implemented method of claim 1, wherein the obtained data comprise context-related information derived from the at least one conversation.

8. The computer-implemented method of claim 1, wherein software implementing the method is provided as a service in a cloud environment.

9. A computer program product comprising a computer readable storage medium having program instructions embodied therewith, the program instructions executable by a computing device to cause the computing device to:
obtain data pertaining to at least one conversation involving at least one automated conversation exchange software program and at least one user;
identify, among words proposed by the at least one automated conversation exchange software program in connection with the at least one conversation, one or more words qualifying as belonging to one or more predetermined categories by processing at least a portion of the obtained data using one or more artificial intelligence techniques, wherein the one or more artificial intelligence techniques comprise at least one artificial intelligence-based natural language generative model, and wherein identifying one or more words comprises penalizing one or more predetermined attributes proposed in one or more outputs of the at least one automated conversation exchange software program by implementing at least one regularizer to at least one loss function of the at least one artificial intelligence-based natural language generative model;

determine, by processing the one or more identified words and at least one word-based data source, one or more alternate words;

modify at least a portion of the words proposed by the at least one automated conversation exchange software program in connection with the at least one conversation by replacing at least a portion of the one or more identified words with at least a portion of the one or more alternate words; and perform at least one automated action based at least in part on the modifying, wherein performing the at least one automated action comprises training at least a portion of the one or more artificial intelligence techniques using one or more bidirectional encoder representations generated from one or more transformer embeddings, the one or more transformer embeddings based at least in part on at least one of the one or more identified words and the one or more determined alternate words.

10. The computer program product of claim 9, wherein performing the at least one automated action comprises outputting a set of words, including the modified portion, in furtherance of the at least one conversation.

11. The computer program product of claim 9, wherein performing the at least one automated action comprises training the one or more artificial intelligence techniques using at least one of the one or more identified words and the one or more determined alternate words.

12. The computer program product of claim 11, wherein training the one or more artificial intelligence techniques comprises incorporating, as part of the one or more artificial intelligence techniques, at least one discriminator which penalizes proposal of the one or more identified words.

13. The computer program product of claim 9, wherein the one or more predetermined categories comprise one or more categories associated with human bias.

14. The computer program product of claim 9, wherein the obtained data comprise unstructured text data derived from the at least one conversation.

15. The computer program product of claim 9, wherein the obtained data comprise context-related information derived from the at least one conversation.

16. A system comprising:

a memory configured to store program instructions; and a processor operatively coupled to the memory to execute the program instructions to:

obtain data pertaining to at least one conversation involving at least one automated conversation exchange software program and at least one user;

identify, among words proposed by the at least one automated conversation exchange software program in connection with the at least one conversation, one or more words qualifying as belonging to one or more predetermined categories by processing at least a portion of the obtained data using one or more artificial intelligence techniques, wherein the one or more artificial intelligence techniques comprise at least one artificial intelligence-based natural language generative model, and wherein identifying one or more words comprises penalizing one or more predetermined attributes proposed in one or more outputs of the at least one automated conversation exchange software program by implementing at least one regularizer to at least one loss function of the at least one artificial intelligence-based natural language generative model;

determine, by processing the one or more identified words and at least one word-based data source, one or more alternate words;

modify at least a portion of the words proposed by the at least one automated conversation exchange software program in connection with the at least one conversation by replacing at least a portion of the one or more identified words with at least a portion of the one or more alternate words; and perform at least one automated action based at least in part on the modifying, wherein performing the at least one automated action comprises training at least a portion of the one or more artificial intelligence techniques using one or more bidirectional encoder representations generated from one or more transformer embeddings, the one or more transformer embeddings based at least in part on at least one of the one or more identified words and the one or more determined alternate words.

* * * * *